US011579633B1

(12) United States Patent
Haslam et al.

(10) Patent No.: US 11,579,633 B1
(45) Date of Patent: Feb. 14, 2023

(54) AUTOMATICALLY DEPLOYABLE DRONE FOR VEHICLE ACCIDENTS

(71) Applicant: UIPCO, LLC, San Antonio, TX (US)

(72) Inventors: Justin Dax Haslam, San Antonio, TX (US); Donnette Moncrief Brown, San Antonio, TX (US); Eric David Schroeder, San Antonio, TX (US); Ravi Durairaj, San Antonio, TX (US); Deborah Janette Schulz, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 517 days.

(21) Appl. No.: 16/721,856

(22) Filed: Dec. 19, 2019

(51) Int. Cl.
| | |
|---|---|
| G05D 1/12 | (2006.01) |
| G06Q 50/26 | (2012.01) |
| B64C 39/02 | (2006.01) |
| B64D 47/08 | (2006.01) |
| G05D 1/10 | (2006.01) |
| G06Q 40/08 | (2012.01) |

(52) U.S. Cl.
CPC ............. *G05D 1/12* (2013.01); *B64C 39/024* (2013.01); *B64D 47/08* (2013.01); *G05D 1/101* (2013.01); *G06Q 50/265* (2013.01); *B64C 2201/027* (2013.01); *B64C 2201/08* (2013.01); *B64C 2201/127* (2013.01); *B64C 2201/141* (2013.01); *B64C 2201/208* (2013.01); *G06Q 40/08* (2013.01)

(58) Field of Classification Search
None
See application file for complete search history.

(56) References Cited

U.S. PATENT DOCUMENTS

| | | | |
|---|---|---|---|
| 2017/0075360 A1* | 3/2017 | Von Novak | G05D 1/0011 |
| 2018/0090013 A1* | 3/2018 | Park | G05D 1/0055 |
| 2018/0141658 A1* | 5/2018 | Baur | G05D 1/0038 |
| 2018/0305017 A1* | 10/2018 | Myslinski | G06Q 50/26 |
| 2018/0319494 A1* | 11/2018 | Aflatoon | B60L 53/12 |
| 2019/0031322 A1 | 1/2019 | Micros | |

(Continued)

OTHER PUBLICATIONS

Ural Air, Oct. 22, 2018 https://www.roadandtrack.com/new-cars/car-technology/a24074935/ural-air-sidecar-motorcycle-built-in-drone/ to include the embedded YouTube Video found at https://youtu.be/42z3Dg69ev8 (Year: 2018).*

*Primary Examiner* — Thomas E Worden
(74) *Attorney, Agent, or Firm* — Plumsea Law Group, LLC

(57) ABSTRACT

Methods and systems for automatically deploying an autonomous drone from a vehicle in response to a triggering event or accident so that data associated with the triggering event or accident may be automatically obtained are described. In one embodiment, a method for deploying an autonomous drone in response to a triggering event is described. The method includes providing an autonomous drone in a vehicle. The method also includes detecting a triggering event associated with the vehicle. Upon detection of the triggering event, the method includes automatically deploying the autonomous drone from the vehicle. The method further includes implementing, by the autonomous drone, a plurality of automatic actions, including recording data associated with the vehicle in which the autonomous drone is provided.

20 Claims, 9 Drawing Sheets

(56) References Cited

U.S. PATENT DOCUMENTS

| | | | |
|---|---|---|---|
| 2019/0047697 A1* | 2/2019 | Kulkarni | G06F 1/1677 |
| 2019/0047699 A1* | 2/2019 | Bonden | H01M 10/635 |
| 2019/0112046 A1* | 4/2019 | Lery | B64D 47/08 |
| 2019/0291864 A1* | 9/2019 | Liu | H04N 7/185 |
| 2019/0392716 A1* | 12/2019 | Lu | H04W 4/44 |
| 2021/0047030 A1* | 2/2021 | Corey | B64C 27/50 |

* cited by examiner

AUTOMATICALLY DEPLOYABLE DRONE FOR VEHICLE ACCIDENTS

BACKGROUND

The present embodiments relate to autonomous drone vehicles in general, and more particularly, to methods and systems for automatically deploying an autonomous drone vehicle in response to a vehicle accident or other triggering event.

Vehicle traffic accidents are responsible for significant costs due to damage to property and infrastructure, as well as other direct and consequential losses and injuries. When an accident occurs, the parties involved may take photos of the resulting damage, and may also have recorded video images, sounds, and other data associated with the accident that can be provided to the police or other authorities in order to determine fault and liability. The accident information may also be provided and used by the insurance companies of the parties involved in the accident to determine fault and other information relevant to submitting a claim for the accident.

Conventional techniques for providing this type of information relies on the parties involved in the accident to take sufficiently useful photos and to provide the data associated with the accident, such as from on-board data recorders and/or dash cameras in the vehicle. However, these conventional techniques may not provide the needed information to properly resolve a claim, and, in some cases, for example, hit-and-run situations, the information and data available may be minimal.

Accordingly, there is a need in the art for a system and method that addresses these shortcomings discussed above.

SUMMARY

In one aspect, a method for deploying an autonomous drone in response to a triggering event is provided. The method includes providing an autonomous drone in a vehicle. The method also includes detecting a triggering event associated with the vehicle. Upon detection of the triggering event, the method includes automatically deploying the autonomous drone from the vehicle. The method further includes implementing, by the autonomous drone, a plurality of automatic actions, including recording data associated with the vehicle in which the autonomous drone is provided.

In another aspect, a method for obtaining data associated with a triggering event by an autonomous drone is provided. The method includes automatically deploying an autonomous drone from a vehicle in response to a triggering event. Upon being deployed, the autonomous drone performs a plurality of automatic actions. The plurality of automatic actions include at least recording data associated with the triggering event, recording data associated with the vehicle in which the autonomous drone is provided, recording data associated with one or more other vehicles involved in the triggering event, recording data associated with one or more people involved in the triggering event, or recording data associated with property damaged during the triggering event. The method also includes storing the recorded data in at least one location.

In another aspect, a system for deploying an autonomous drone in response to a triggering event is provided. The system includes a vehicle, an autonomous drone provided in the vehicle, and a drone control system in the vehicle. The drone control system is configured to detect a triggering event associated with the vehicle. Upon detection of the triggering event, the drone control system is also configured to automatically deploy the autonomous drone from the vehicle. Upon being deployed, the autonomous drone is configured to implement a plurality of automatic actions, including recording data associated with the vehicle in which the autonomous drone is provided.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

According to the principles of the example embodiments described herein, a method and system for automatically deploying an autonomous drone vehicle in response to a vehicle accident or other triggering event are provided. The techniques of the present embodiments provide a mechanism for using autonomous drone vehicles to acquire information relevant to an accident or other event for use by insurance companies, as well as the police or other authorities.

Figure 1:
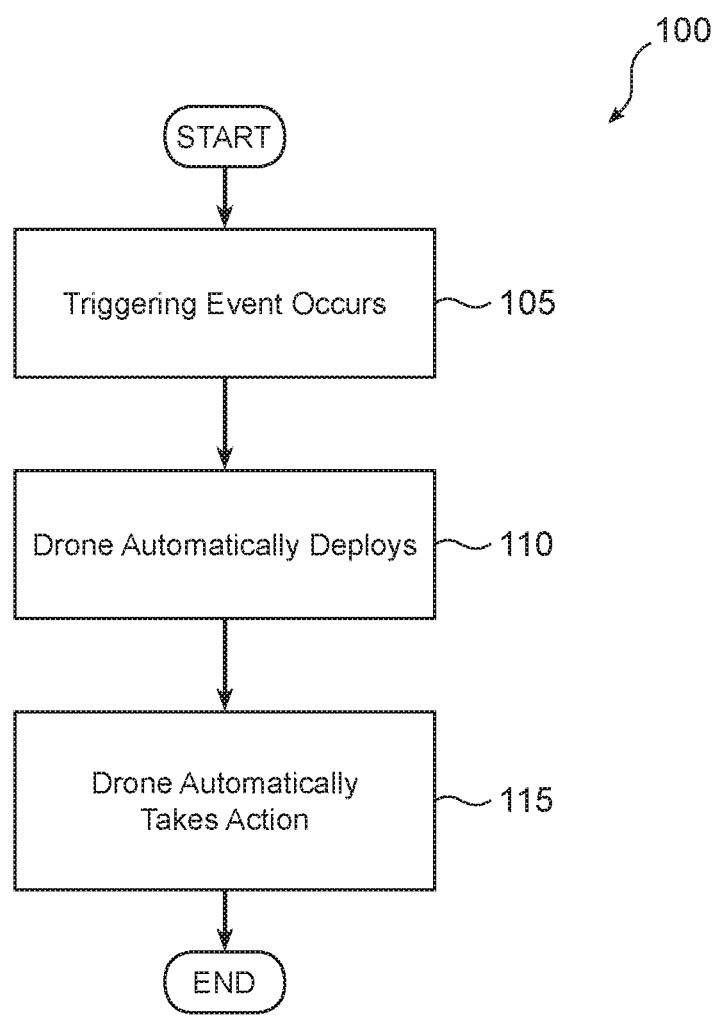
FIG. 1 is an embodiment of a process for deploying an autonomous drone.

Referring now to FIG. 1, an example embodiment of a process 100 in which techniques of the present embodiments may be implemented to automatically deploy an autonomous drone vehicle in response to a vehicle accident or other triggering event is shown. In an example embodiment, a vehicle is provided with an autonomous drone vehicle (also referred to herein simply as "drone") that is configured to be automatically deployed according to process 100. In this embodiment, process 100 for deploying the drone includes an operation 105. At operation 105, a triggering event associated with the vehicle in which the drone is located occurs. In some embodiments, the triggering event associated with operation 105 may take one or more different forms. For example, the triggering event may be a motor vehicle accident, including a single-vehicle accident, as well as a multi-vehicle accident. The triggering event may also include other incidents or circumstances that result in damage, vandalism, destruction of property, injury to people, and/or similar occurrences.

At operation 105, the detection of the triggering event may be based, in part, on the type of triggering event. For example, some triggering events may be detected based on measurements from accelerometers or force sensors in a vehicle that exceed a predetermined threshold indicative of an accident or other impact involving the vehicle. Other triggering events may be detected based on information from other types of sensors, such as cameras that capture the triggering event or microphones that detect breaking glass or other sounds that are indicative of an accident or other triggering event.

Next, process 100 includes an operation 110. At operation 110, in response to the triggering event at operation 105, the autonomous drone is automatically deployed. In an example embodiment, the drone may be deployed from a compartment or other storage area in the vehicle. For example, at operation 110, the autonomous drone may be automatically deployed from the vehicle that undergoes or experiences the triggering event at operation 105. In other embodiments, at operation 110 the drone may be automatically deployed from other locations, such as from an exterior of the vehicle, under the vehicle, or from a platform separate from the vehicle, for example, a trailer or equipment along the road.

In an example embodiment, process 100 also includes an operation 115. At operation 115, the autonomous drone deployed at operation 110 automatically takes action. In different embodiments, the automatic actions taken by the drone at operation 115 of process 100 may vary. For example, in one embodiment, the automatic actions taken by the autonomous drone at operation 115 may include recording data associated with the triggering event or accident, such the time and date of the triggering event or accident, the scene and/or location where the triggering event or accident occurred, the drivers and/or other people affected by the triggering event or accident, the vehicles and/or property involved in the triggering event or accident, and other relevant information to the triggering event or accident. This recorded data may include photos, videos, sound recordings, measured or sensed parameters (e.g., temperatures, weather data, vehicle data obtained from on-board sensors, etc.), or other information obtained by the autonomous drone.

In some embodiments, the automatic actions taken at operation 115 may include moving the drone to one or more different orientations to obtain data, such as images or photos, of the accident site or scene of the triggering event from different angles. In some cases, moving the drone may also include instructing the drone to follow a vehicle, person, or other object of interest associated with the triggering event or accident. The automatic actions taken at operation 115 may also include uploading the recorded data or other information to one or more databases or data storage locations, including, but not limited to cloud storage, mobile device storage, and/or local storage, such as on-board the vehicle and/or drone itself. Additionally, the automatic actions may further include transmitting or sending the recorded data or other information to at least one entity, such as an insurance company, police or other authorities, emergency services, repair facilities, etc.

It should be understood that at operation 115, the automatic actions taken by the autonomous drone may include one or more actions. Additionally, the automatic actions may be based, in part, on the type of triggering event or accident. For example, a single-vehicle accident may result in a first set of automatic actions (e.g., recording data associated with the accident site and property damage) that are different than a second set of automatic actions taken by the autonomous drone in response to a multi-vehicle accident (e.g., recording data associated with each driver in the accident and each of the respective driver's vehicle).

In some embodiments, the actions taken automatically by the autonomous drone at operation 115 may be prioritized, so that some actions are prioritized over other actions. Embodiments with prioritized actions taken by the autonomous drone will be described in detail in reference to FIG. 9 below.

Figure 2:
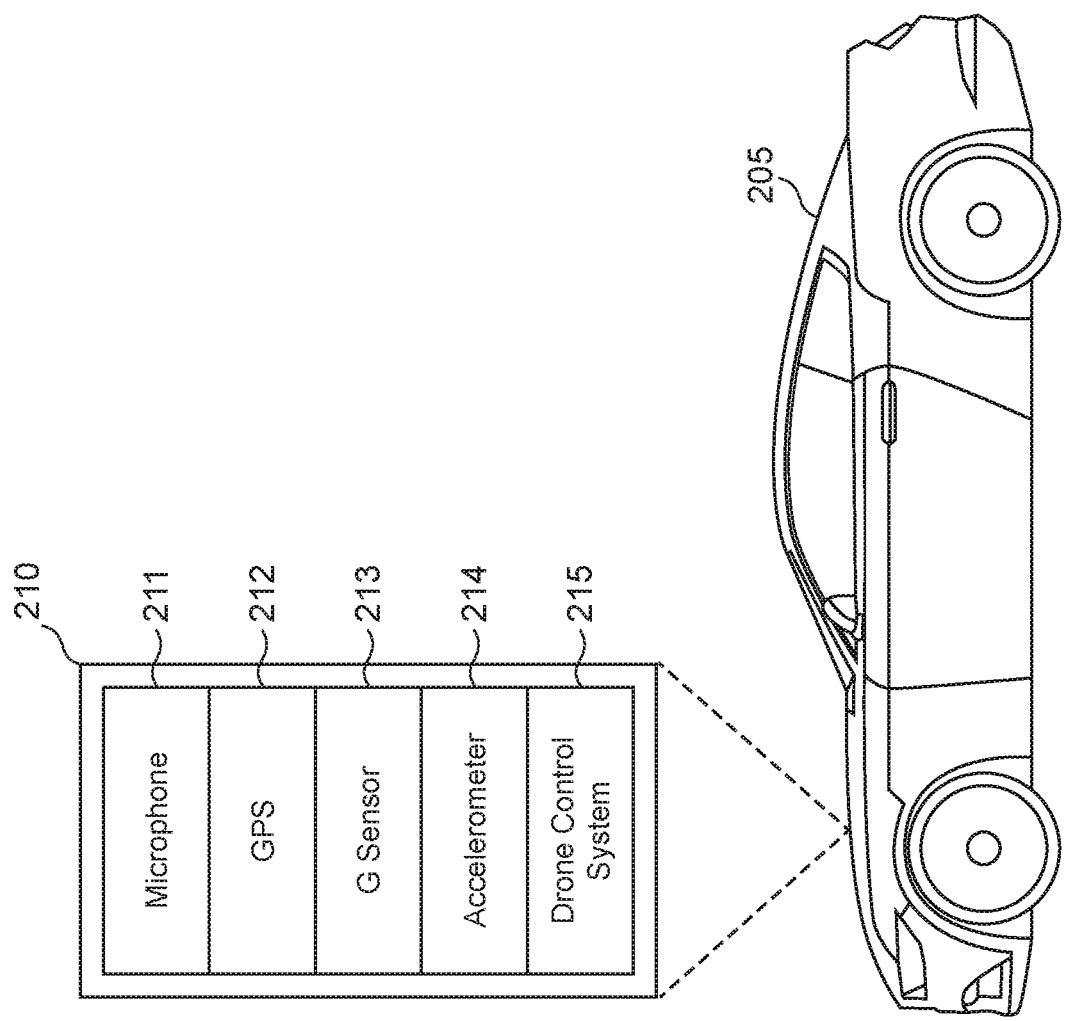
FIG. 2 is a schematic diagram of components associated with a motor vehicle.

Referring now to FIG. 2, a schematic diagram of an example embodiment of a vehicle 205 in which the deployable autonomous drone vehicle according to the techniques described herein may be provided. In this embodiment, vehicle 205 is a motor vehicle, but it should be understood that in other embodiments a deployable autonomous drone may be provided in other types of vehicles. In an example embodiment, vehicle 205 may be provided with a plurality of components 210 that may be used as part of the deployable autonomous drone system and method described in the present embodiments.

In some embodiments, plurality of components 210 provided with vehicle 205 may include one or more sensors to detect or collect various data or other information associated with vehicle 205. For example, in this embodiment, plurality of components 210 includes a microphone 211. Microphone 211 may be configured to record and/or collect sounds associated with vehicle 205, including sounds emanating from inside and/or outside of vehicle 205. For example, microphone 211 may be configured to record sounds in the passenger compartment or interior of vehicle 205 and/or sounds outside of vehicle 205 that occur within a predetermined time period from the triggering event or accident. The predetermined time period may include the time of the triggering event or accident, a time window prior to the triggering event or accident, as well as a time window after the triggering event or accident. With this arrangement, relevant sounds related to the triggering event or accident may be obtained or recorded.

In an example embodiment, plurality of components 210 may also include a global position system (GPS) sensor 212. GPS sensor 212 may be configured to obtain data associated with the location and/or movement of vehicle 205. For example, GPS sensor 212 may be configured to provide location, speed, heading, and other information associated with movement of vehicle 205 within a predetermined time period from the triggering event or accident, as described above. With this arrangement, relevant location and/or movement data associated with vehicle 205 in connection with the triggering event or accident may be obtained or recorded.

In some embodiments, plurality of components 210 may include one or more sensors configured to detect shocks or forces felt or applied to vehicle 205, such as acceleration/deceleration information or impacts detected by a G sensor 213 and/or an accelerometer 214. For example, G sensor 213 may detect information associated with shocks, such as an impact, or lateral forces, such as during cornering or side impact, of vehicle 205 within a predetermined time period before, after, and during the triggering event or accident. Accelerometer 214 may also detect information associated with acceleration/deceleration of vehicle 205 before, after, and during the triggering event or accident. With this arrangement, relevant acceleration/deceleration and force information experienced by vehicle 205 in connection with the triggering event or accident may be obtained or recorded.

Additionally, in some embodiments, information from one or more of G sensor 213 and/or accelerometer 214 may be used to trigger the deployment of the autonomous drone. For example, an impact or acceleration/deceleration above a predetermined threshold may be used to indicate that a triggering event or accident occurred to vehicle 205 in which the drone is provided (e.g., as part of operation 105 of process 100, described above).

In some embodiments, plurality of components 210 may also include a drone control system 215. Drone control system 215 may be configured to provide instructions and commands to the drone in accordance with the example embodiments described herein. In an example embodiment, drone control system 215 may receive information indicative of an accident or other impact involving vehicle 205 from one or more of plurality of components 210 in vehicle 205 to detect a triggering event or accident. Drone control system 215 may also be configured to automatically deploy the drone in response to the detected triggering event or accident (e.g., as part of operation 110 of process 100, described above).

Additionally, drone control system 215 may be configured to implement other functions or operations performed by the drone, such as providing the relevant priority for automatic actions, such as data collection, data storage, and/or data transmission, by the drone. It should also be understood that drone control system 215 may be configured to provide other controls and/or commands to the deployable autonomous drone of the present embodiments. For example, in some embodiments, drone control system 215 may provide a user with a user interface within vehicle 205 for monitoring a feed or views from the drone and/or providing manual control or commands to the drone.

In this embodiment, plurality of components 210 provided in vehicle 205 is merely exemplary. However, it should be understood that plurality of components 210 may include a variety of different components that are conventionally provided in a vehicle. Additionally, conventional vehicle sensors include interfaces and communication mechanisms that permit the data and information obtained by these vehicle sensors to be transmitted to other components within the vehicle.

Figure 3:
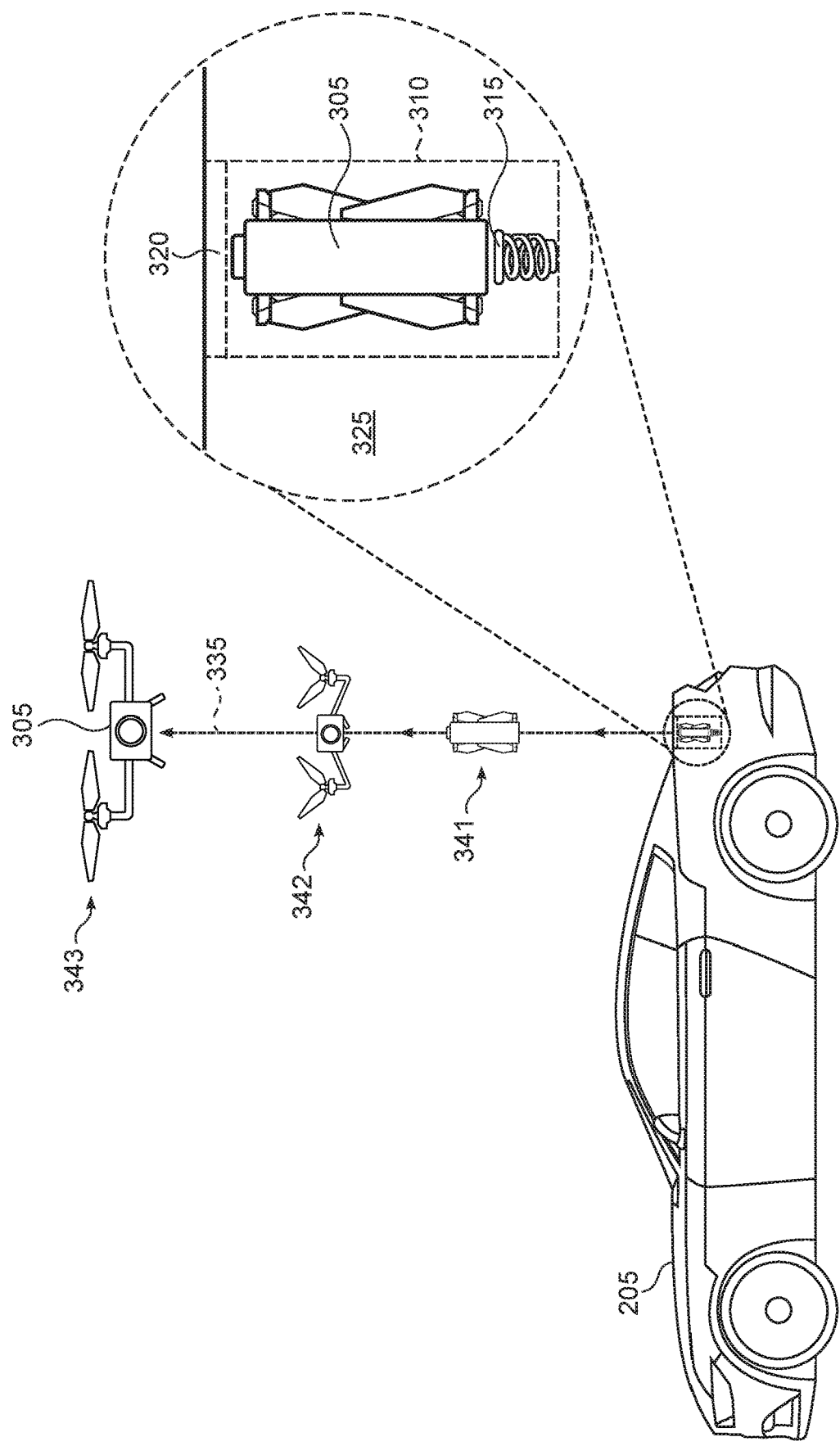
FIG. 3 is a schematic diagram of an embodiment for a system to launch a drone.

Referring now to FIG. 3, an example embodiment of an autonomous drone vehicle being deployed from vehicle 205 is shown. As described above, in some embodiments, a vehicle (e.g., vehicle 205) may include a compartment or storage area configured to accommodate a drone. In an example embodiment, an autonomous drone 305 is provided in a storage area 310 of vehicle 205. In this embodiment, storage area 310 configured to store or hold drone 305 in a first or initial configuration associated with a closed position of storage area 310. For example, in the first or initial configuration inside storage area 310, drone 305 is folded up prior to being deployed.

In some embodiments, storage area 310 may be provided with mechanisms to launch or deploy drone 305 from storage area 310 of vehicle 205. In this embodiment, storage area 310 includes a launch device 315 that is configured to provide an upward force to drone 305 to launch or deploy it from storage area 310. For example, launch device 315 may be a spring or piston that actuates upon detection of the triggering event or accident, such as described above in reference to process 100.

In some embodiments, storage area 310 may include a cover 320 that is located above drone 305 and closes storage area 310 from the exterior of vehicle 205. With this arrangement, cover 320 may protect drone 305 from tampering and prevent debris or other objects from falling into storage area 310 to interfere with deploying drone 305. Additionally, cover 320 may also provide a substantially uniform exterior surface to vehicle 205 so that storage area 310 does not appear conspicuous from outside of vehicle 205.

In various embodiments, storage area 310 may be located in any suitable location on and/or nearby vehicle 205. In this embodiment, storage area 310 is located at the rear of vehicle 205 within a trunk 325 where there is sufficient space to accommodate storage area 310 and drone 305. In other embodiments, storage area 310 may be provided in other locations on vehicle 205, such as at the front, side(s), under, or on an exterior of vehicle 205. In still other embodiments, storage area 310 may be provided on a platform separate from vehicle 205, for example, on a trailer or equipment along the road.

As shown in FIG. 3, drone 305 is deployed from the first or initial configuration in a closed position inside storage area 310 to a second or deployed configuration outside of vehicle 205. For example, in this embodiment, upon being launched or deployed from storage area 310 in a launch direction 335, drone 305 initially exits storage area 310 in a first position 341 that is substantially similar to the closed position of drone 305 while contained within storage area 310. Next, as part of the deployment process, drone 305 begins to unfurl or unfold flying mechanisms, such as rotors, in an intermediate second position 342. Finally, in the second or deployed configuration, drone 305 is in a third position 343 having fully extended the flying mechanisms and having moved any sensors, such as cameras or other image sensors, into active positions to be able to obtain data associated with the triggering event or accident.

It should be understood that the progression of drone 305 from the first or initial configuration to the second or deployed configuration may occur quickly, for example, on the order of a second or less. That is, upon being launched or deployed from storage area 310 of vehicle 205 in launch direction 335, drone 305 progresses rapidly from first position 341 to second position 342 to third position 343. In other embodiments, however, drone 305 may be stored for deployment in the deployed configuration so that it is immediately available upon deployment.

Figure 4:
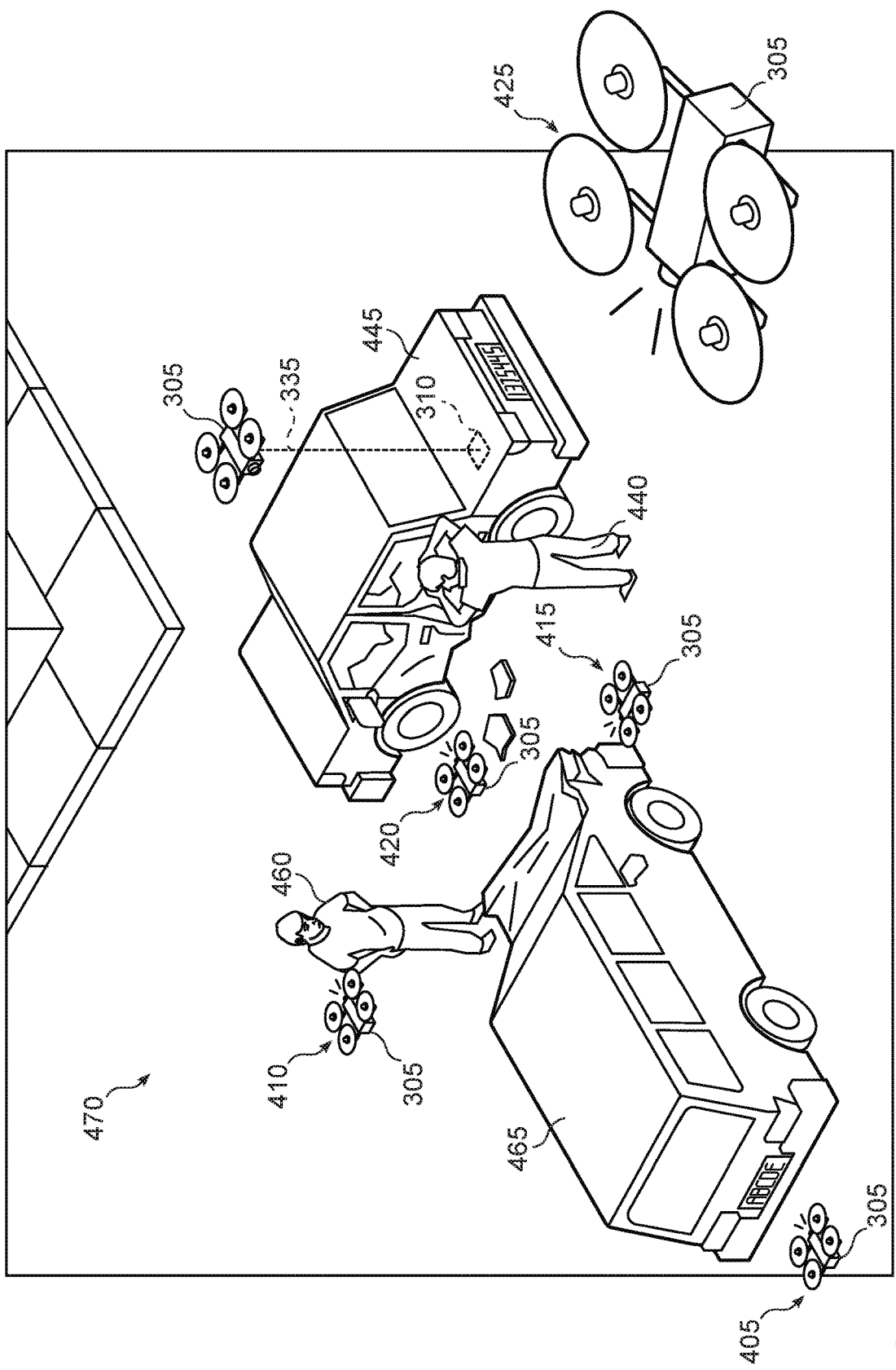
FIG. 4 is a schematic view of an embodiment of a triggering event.

Referring now to FIG. 4 through FIG. 7, example scenarios of drone 305 being deployed in response to various triggering events are shown. FIG. 4 illustrates an example scenario in the form of an accident scene 470 involving multiple vehicles. In this embodiment, a first driver 440 of a first vehicle 445 is involved in an accident with a second driver 460 of a second vehicle 465. In this scenario, first vehicle 445 is provided with drone 305 that is deployed in launch direction 335 from storage area 310 of first vehicle 445 in response to the triggering event (i.e., the accident involving first vehicle 445 and second vehicle 465).

According to the techniques of the example embodiments described herein, upon deployment of drone 305 in response to the triggering event, one or more automatic actions may be taken by drone 305. In this embodiment, drone 305 obtains or records a series of images or videos of accident scene 470. In an example embodiment, drone 305 may automatically obtain or record the images or videos of accident scene 470 from a variety of different angles or orientations. For example, in this embodiment, drone 305 obtains images from a first orientation 405, a second orientation 410, a third orientation 415, a fourth orientation 420, and a fifth orientation 425. In some embodiments, the various orientations from which drone 305 obtains images or videos may completely cover accident scene 470 (i.e., from a 360 degree field of view).

In other embodiments, drone 305 may obtain images from a larger or smaller number of orientations or angles. For example, the number of orientations or angles may depend on the size or location of the accident scene, as well as other factors, such as the extent of damage to vehicles, people, and/or property. With this arrangement, drone 305 may be configured to obtain images, videos, or other data from multiple angles and orientations over the accident scene to assist with insurance claims and/or reconstructing the events of the accident from the scene.

Figure 5:
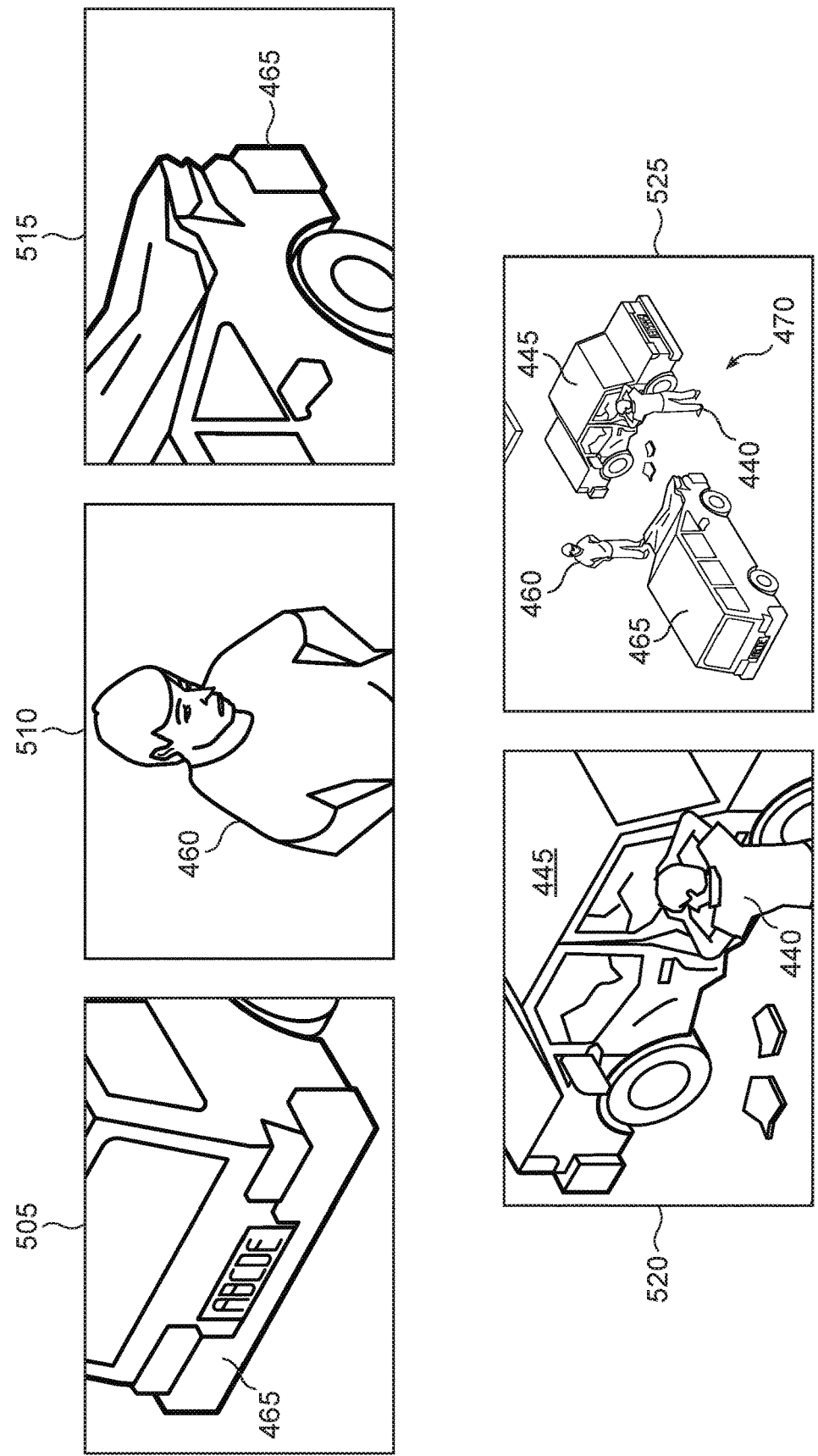
FIG. 5 is a schematic view of an embodiment of images associated with a triggering event.

Referring now to FIG. 5, the images obtained from drone 305 from the various orientations (e.g., first orientation 405, second orientation 410, third orientation 415, fourth orientation 420, and fifth orientation 425) from FIG. 4 are shown in detail. In some embodiments, the automatic actions taken by drone 305 may include obtaining images or videos of the accident scene, vehicles involved in the accident, people involved in or witnessing the accident (i.e., drivers, passengers, bystanders, pedestrians, etc.), damage to vehicles or other property, as well as other items of interest that may be relevant to the specific accident or triggering event.

In this embodiment, the images obtained from drone 305 include a first image 505 taken from first orientation 405. First image 505 is a photo or video of second vehicle 465 that was involved in the accident. In an example embodiment, first image 505 may include identifying information associated with second vehicle 465, such as a license plate, VIN, registration sticker, or other identifier. In addition, first image 505 may also be used to identify other information associated with second vehicle 465, such as a make, model, color, etc.

A second image 510 may be obtained by drone 305 from second orientation 410. In this embodiment, second image 510 is a photo or video of second driver 460 of second vehicle 465. In an example embodiment, second image 510 may include a face or other identifying information associated with second driver 460 to confirm or verify an identity of second driver 460, such as through facial recognition or other technology. In some embodiments, second image 510 may also be used to record any visible injuries to second driver 460 at accident scene 470.

In this embodiment, the images obtained from drone 305 also include a third image 515 taken from third orientation 415. Third image 515 is another photo or video of second vehicle 465 that was involved in the accident. In an example embodiment, third image 515 may include any damage to second vehicle 465. A fourth image 520 obtained by drone 305 from fourth orientation 420 may include a photo or video of first vehicle 445 that was involved in the accident. In an example embodiment, fourth image 520 may include any damage to first vehicle 445. Additionally, in this embodiment, fourth image 520 also includes first driver 440 in the photo or video, which may be used to record any visible injuries to first driver 440 at accident scene 470.

Finally, in this embodiment, the images obtained from drone 305 further include a fifth image 525 taken from fifth orientation 425. Fifth image 525 is a photo or video of accident scene 470 taken from a distance in order to include all of the relevant parties and vehicles involved in the accident, for example, each of first driver 440, first vehicle 445, second driver 460, and second vehicle 465. Additionally, in some embodiments, fifth image 525 may further include other relevant details of accident scene 470, such as tire tracks or marks, lane markings, traffic control mechanisms (e.g., signs, traffic lights, etc.), surrounding environment, and other information that may be helpful to recreate the conditions surrounding the accident.

Figure 6:
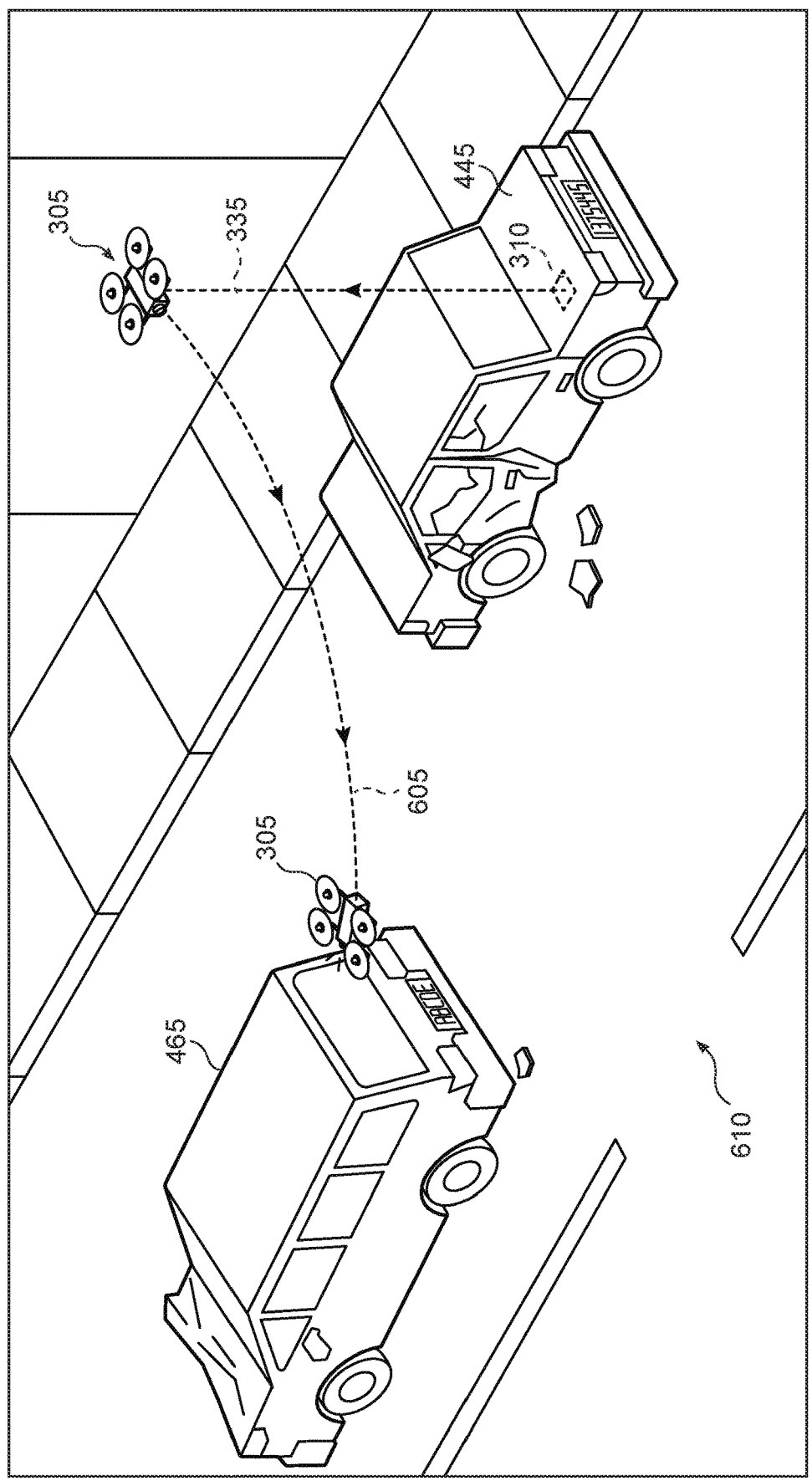
FIG. 6 is a schematic view of an embodiment of an additional triggering event.

Referring now to FIG. 6, another example scenario in the form of an accident scene 610 involving a hit-and-run to a parked vehicle is illustrated. In this embodiment, first vehicle 445 is unoccupied and parked along a curb when impacted by second vehicle 465. As shown in FIG. 6, after hitting first vehicle 445, second vehicle 465 continues to drive away (i.e., a hit-and-run accident). In this scenario, first vehicle 445 is provided with drone 305 that is deployed in launch direction 335 from storage area 310 of first vehicle 445 in response to the triggering event (i.e., the hit-and-run accident involving first vehicle 445 and second vehicle 465). Upon deployment, drone 305 automatically moves in a travel direction 605 towards second vehicle 465 to obtain images or other information associated with second vehicle 465.

In an example embodiment, drone 305 may follow second vehicle 465 for a predetermined distance or amount of time, or until drone 305 obtains sufficient identifying information associated with second vehicle 465, such as a license plate and/or vehicle make, model, color, etc. In other embodiments, drone 305 may continue to follow second vehicle 465 along travel direction 605 so that the police or other authorities may track the location of drone 305 and find second vehicle 465. For example, this may be helpful in circumstances where the driver of second vehicle 465 is impaired and presents a danger to other people and property.

With this arrangement, drone 305 may be used to obtain information about accident scene 610 and second vehicle 465 in this scenario to track down the responsible party for the hit-and-run accident to first vehicle 445. Conventionally, the owner of first vehicle 445 would be left with little recourse or information about the identity of second vehicle 465 to submit an insurance claim or report to the authorities. The deployable autonomous drone of the present embodiments, however, provides a mechanism for the owner of first vehicle 445 to obtain information about the responsible party.

Figure 7:
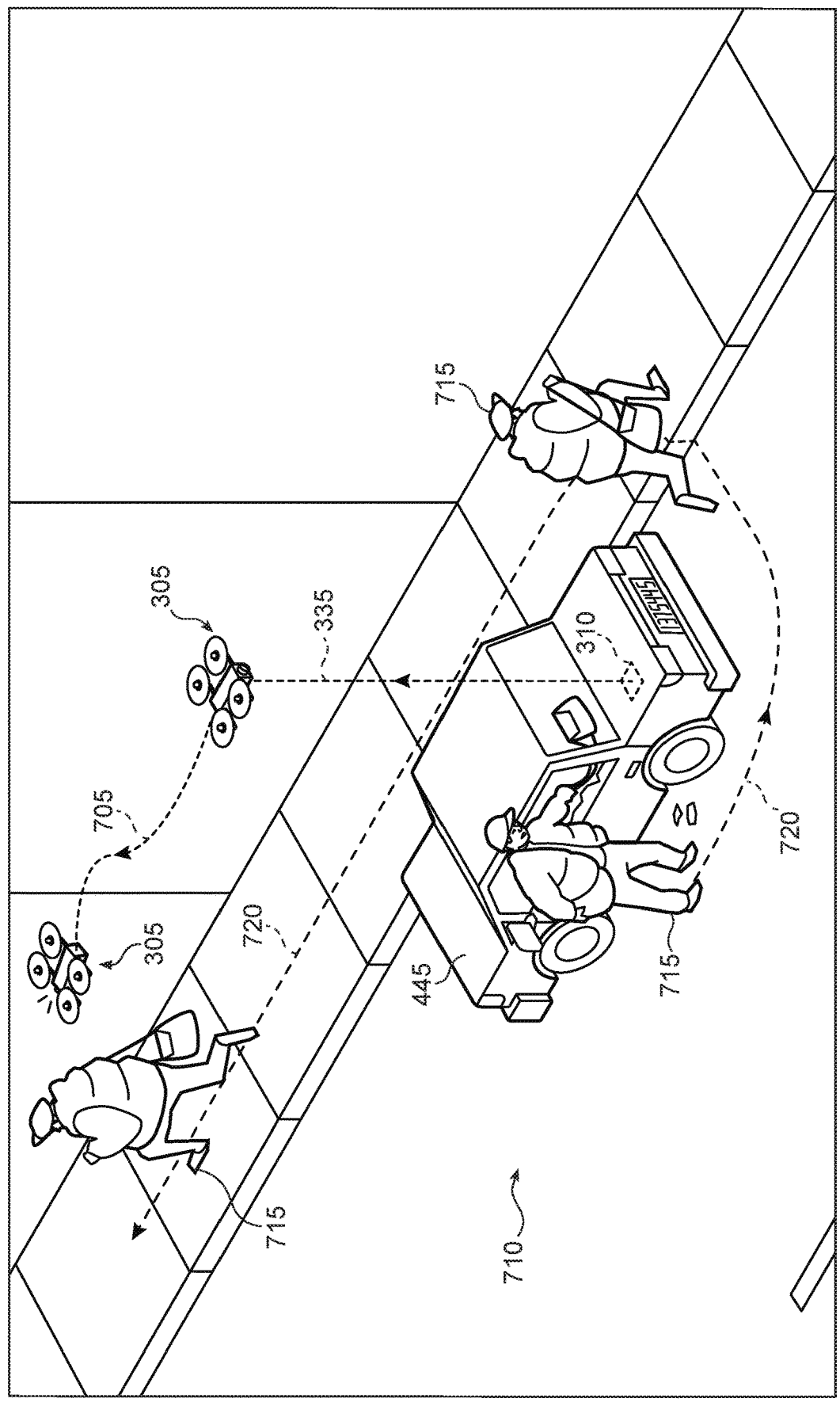
FIG. 7 is a schematic view of an embodiment of another additional triggering event.

In some embodiments, the method and system of deploying an autonomous drone in response to a triggering event may also be used in connection with triggering events to a vehicle that do not involve other vehicles or an accident. Referring now to FIG. 7, an example scenario in the form of a triggering event 710 involving damage or vandalism to first vehicle 445 is shown. In this embodiment, first vehicle 445 is unoccupied and parked along a curb when it experiences triggering event 710, such as a broken window. As shown in FIG. 7, a thief 715 has broken a window of first vehicle 445 and removed a personal item, for example, a purse. In response to detecting triggering event 710, for example, using G sensor 213 and/or accelerometer 214 to detect the impact causing the broken window or using microphone 211 to detect the sound of broken glass, drone 305 is deployed in launch direction 335 from storage area 310 of first vehicle. Upon deployment, drone 305 automatically moves in a travel direction 705 following thief 715 to obtain images or other information associated with thief 715 and/or to document the items removed from first vehicle 445.

In an example embodiment, drone 305 may follow thief 715 along a fleeing direction 720 for a predetermined distance or amount of time, or until drone 305 obtains sufficient identifying information associated with thief 715, such as an image of thief 715's face, clothing, or other information useful to catch thief 715. In other embodiments, drone 305 may continue moving along travel direction 705 to follow thief 715 in fleeing direction 720 so that the police or other authorities may track the location of drone 305 and find thief 715.

With this arrangement, drone 305 may be used to obtain information about triggering event 710 and thief 715 in this scenario to track down the responsible party for the break in to first vehicle 445. As with the previous scenario, the owner of first vehicle 445 would conventionally be left with little recourse or information about the identity of thief 715 to submit an insurance claim or report to the authorities. The deployable autonomous drone of the present embodiments, however, provides a mechanism for the owner of first vehicle 445 to obtain information about the responsible party.

In some embodiments, the autonomous drone described herein (e.g., drone 305) may be configured to automatically upload or store the recorded data or other information obtained from the scene of the accident or triggering event to one or more databases or data storage locations, including, but not limited to cloud storage, mobile device storage, and/or local storage, such as on-board the vehicle and/or drone itself. Additionally, the drone may be further configured to transmit or send the recorded data or other information to at least one entity, such as an insurance company, police or other authorities, emergency services, repair facilities, etc.

Figure 8:
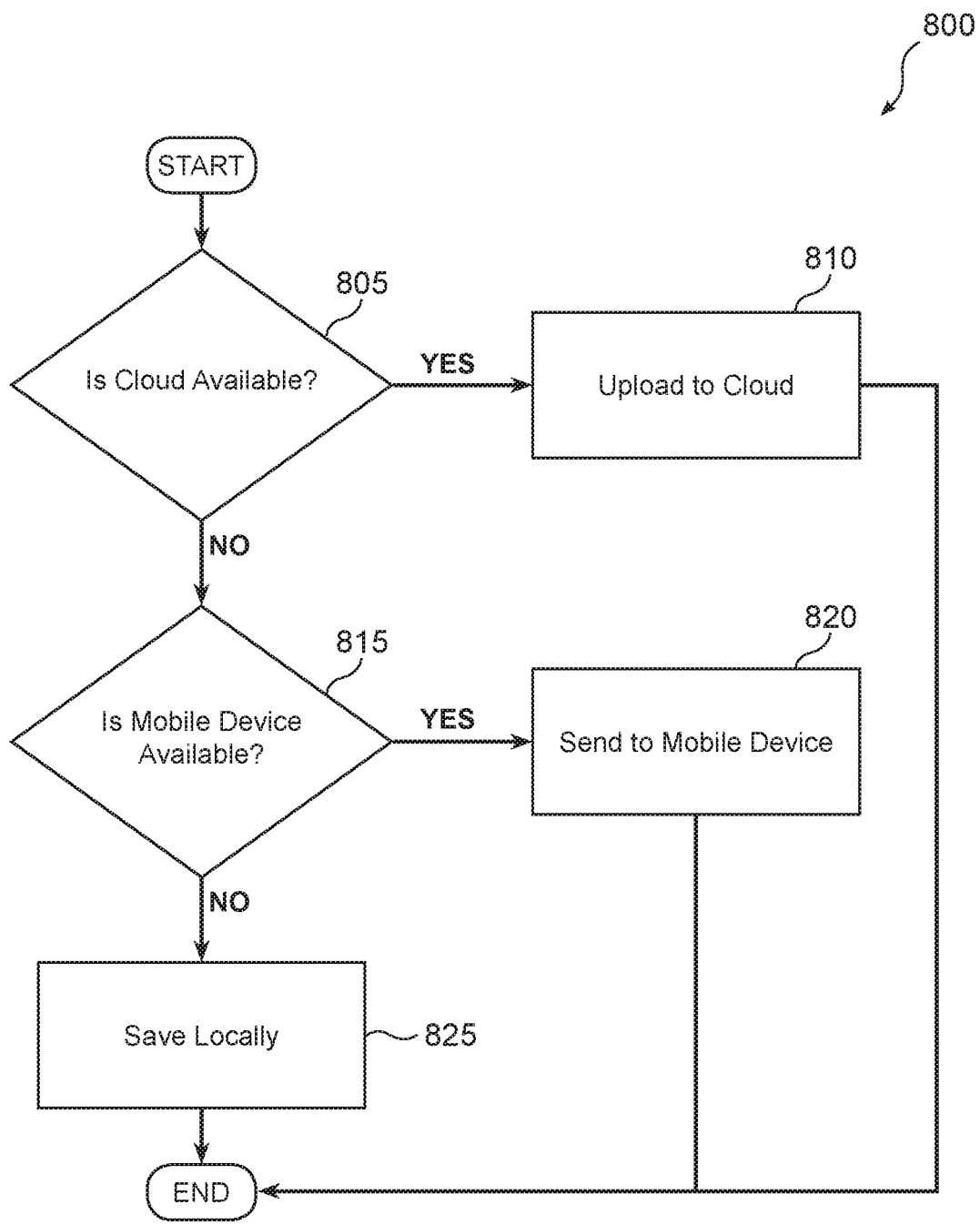
FIG. 8 is an embodiment of a process for storing data.

Referring now to FIG. 8, a flowchart of an example embodiment of a method 800 for uploading or storing the recorded data associated with the triggering event or accident is shown. In an example embodiment, method 800 may be implemented by an autonomous drone vehicle, for example, drone 305, described above. In this embodiment, method 800 begins with an operation 805 where whether or not cloud storage is available for the drone to upload or save the recorded data. Upon determining at operation 805 that cloud storage is available, then method 800 proceeds to an operation 810. At operation 810, the recorded data obtained by the drone in response to the triggering event or accident is uploaded to cloud storage. With this arrangement, the recorded data associated with the triggering event or accident may be securely and conveniently stored in the cloud, where it may be accessed by a user, the user's insurance company, the police or other authorities, or other interested parties or entities. Upon completion of uploading the data to the cloud at operation 810, method 800 ends.

Upon determining at operation 805 that cloud storage is not available, for example, if the drone does not have network connectivity due to its location or other reasons, method 800 may proceed to an operation 815. At operation 815, whether or not a mobile device is available to receive the recorded data from the drone is determined. For example, a mobile device associated with a driver or user of the vehicle in which the drone is provided may be connected to the drone using a short-range wireless communication technology, such as Bluetooth or WiFi. Upon determining at operation 815 that a mobile device is available, then method 800 proceeds to an operation 820. At operation 820, the recorded data obtained by the drone in response to the triggering event or accident is uploaded to the mobile device. With this arrangement, the recorded data associated with the triggering event or accident may be securely and conveniently stored in a mobile device in communication with the drone. Once stored on the mobile device, the recorded data may be accessed by the user and/or transmitted to the user's insurance company, the police or other authorities, or other interested parties or entities. Upon completion of uploading the data to the mobile device at operation 820, method 800 ends.

Upon determining at operation 815 that a mobile device is not available, for example, if the drone is not in communication with a mobile device or sufficient storage capacity is not available, method 800 may proceed to an operation 825. At operation 825, the recorded data from the drone is saved locally. For example, in some embodiments, the drone may be provided with a storage cache or other on-board data storage device, including, but not limited to a hard drive, memory card, flash memory, thumb drive, or other form of data storage. With this arrangement, the recorded data associated with the triggering event or accident may be securely and conveniently stored on-board the drone. Once stored on the drone, the recorded data may be later transferred to cloud storage and/or a mobile device, or transmitted to the user, the user's insurance company, the police or other authorities, or other interested parties or entities. Upon completion of storing the recorded data to the drone at operation 825, method 800 ends.

In some embodiments, method 800 may be prioritized such that a preference for one type of storage or storage location for the recorded data is attempted first before attempting another storage location. For example, in this embodiment, method 800 first attempts to upload the recorded data to the cloud, then the mobile device, and, finally, locally on board the drone. However, in other embodiments, the prioritization may be different. For example, in another embodiment, method 800 may prioritize saving the recorded data to the mobile device prior to attempting other storage locations. Similarly, method 800 may be modified to reflect different priorities for storage of the recorded data depending on the scenario or circumstances. For example, in a hit-and-run situation or a theft scenario, method 800 may prioritize storing the recorded data in the cloud or transmitting the recorded data immediately to the police or authorities so that the responsible party may be quickly apprehended.

Figure 9:
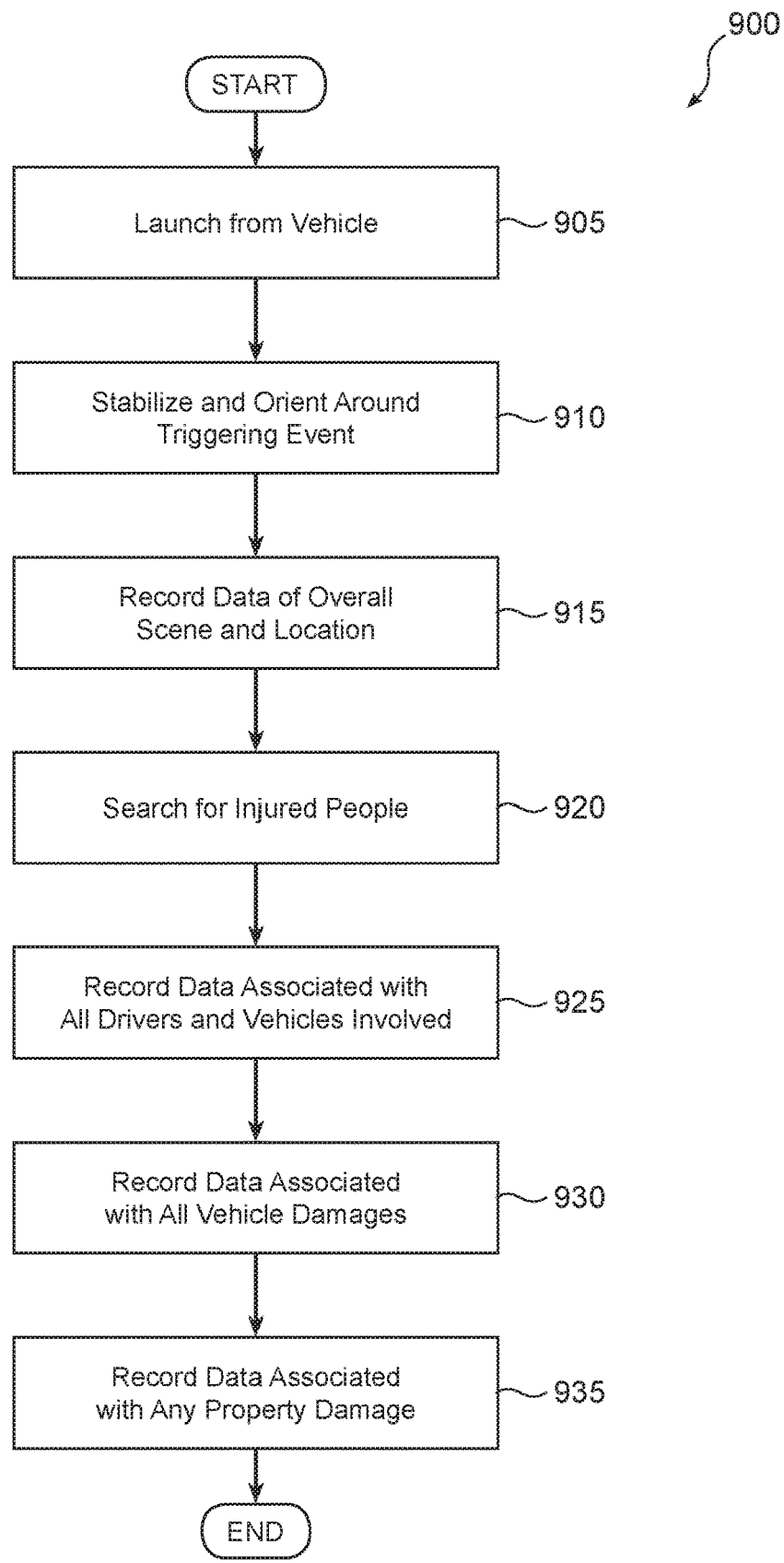
FIG. 9 is an embodiment of a process for automatic drone action.

As described above, in some embodiments, the automatic actions taken by the drone upon deployment may be prioritized so that higher priority actions are performed or implemented by the drone in response to the triggering event or accident before other, lower priority actions. Referring now to FIG. 9, an example embodiment of a process 900 for implementing a plurality of automatic actions by an autonomous drone according to a predetermined priority order is shown.

In an example embodiment, process 900 may be implemented by an automatic drone deployed according to the techniques of the example embodiments described herein, for example, drone 305, described above. In this embodiment, process 900 includes a number of automatic actions that are performed by the drone in response to being deployed upon detection of a triggering event or accident (e.g., as part of operation 115 of process 100, described above). As shown in FIG. 9, process 900 may begin at an operation 905, where the drone is launched from the vehicle in which it is provided. For example, the drone may be launched at operation 905 from a compartment or other storage area in the vehicle upon detection of a triggering event or accident.

Next, process 900 includes an operation 910. After being launched at operation 905, at operation 910 the drone automatically stabilizes itself (e.g., using rotors or other flying mechanisms) and orients itself around the triggering event or accident. For example, orienting the drone at operation 910 may include pointing sensors, such as a camera or image sensor, at the scene of the accident or triggering event, including at one or more of the vehicles involved. At an operation 915, process 900 includes recording data of the overall scene and location of the triggering event or accident. For example, at operation 915, the drone may record or obtain one or more images of the accident scene, such as accident scene 470, accident scene 610, or the scene around triggering event 710, described above.

In this embodiment, process 900 also includes an operation 920. At operation 920, the drone searches for any injured people at the scene. For example, at operation 920, the injured people may be drivers or passengers of the vehicle(s) involved in the triggering event or accident, pedestrians, or other bystanders. At an operation 925, the drone may automatically record data (e.g., images, videos, sound recordings, and other sensor information) associated with all of the people and vehicles involved in the accident or triggering event. In some embodiments, operation 925 may include obtaining identification information associated with each of the people and/or vehicles involved, for example, as described above in reference to FIGS. 4-7.

Next, process 900 may further include an operation 930. At operation 930, the drone records data associated with the damage to all of the vehicles involved in the accident or triggering event. In some embodiments, process 900 may also include an operation 935, where the drone obtains or records data associated with other damage, such as damage to property or other objects at the scene as a result of the triggering event or accident. Upon completion of process 900, the drone may be configured to automatically store the recorded data, for example, as described above with reference to method 800. In addition, in some embodiments, the drone may automatically transmit the recorded data to one or more parties, as described above.

With this configuration, the techniques of the present embodiments described above provide a system and method for automatically deploying an autonomous drone from a vehicle in response to a triggering event or accident so that data associated with the triggering event or accident may be automatically obtained, recorded, stored, and/or transmitted to an insurance provider, the police, or other authorities.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method for deploying an autonomous drone in response to a triggering event, the method comprising:
   providing the autonomous drone in a vehicle;
   detecting the triggering event associated with the vehicle, wherein the triggering event includes at least one of a single-vehicle accident, a multi-vehicle accident, a hit-and-run scenario, and/or a damage or vandalism scenario to the vehicle;
   upon detection of the triggering event, automatically deploying the autonomous drone from the vehicle;
   recording, using the autonomous drone while being deployed, data associated with the vehicle;
   implementing, by the autonomous drone, a plurality of first automatic actions only when the triggering event includes at least one of the single-vehicle accident or the multi-vehicle accident;
   if the triggering event does not include at least one of the single-vehicle accident or the multi-vehicle accident, implementing, by the autonomous drone, a plurality of second automatic actions only when the triggering event includes at least one of the hit-and-run scenario or the damage or vandalism scenario to the vehicle; and
   wherein the plurality of second automatic actions are different than the plurality of first of automatic actions.

2. The method according to claim 1, wherein the autonomous drone is provided in the vehicle in a storage area.

3. The method according to claim 2, wherein the autonomous drone is in a first configuration inside the storage area; and
   wherein, upon being deployed, the autonomous drone is configured to transition from the first configuration to a second configuration.

4. The method according to claim 1, the method further comprising storing the recorded data.

5. The method according to claim 4, wherein storing the recorded data includes at least one of uploading the recorded data to cloud storage, storing the recorded data to a mobile device, or storing the recorded data locally on board the autonomous drone.

6. The method according to claim 1, wherein detecting the triggering event includes receiving information from at least one sensor associated with the vehicle in which the autonomous drone is provided.

7. The method according to claim 6, wherein the at least one sensor includes one or more of an accelerometer, a G sensor, and/or a microphone.

8. The method according to claim 6, wherein detecting the triggering event includes processing the received information from the at least one sensor associated with the vehicle to determine when the triggering event includes at least one of the single-vehicle accident and/or the multi-vehicle accident, and/or when the triggering event includes at least one of the hit-and-run scenario and/or the damage or vandalism scenario to the vehicle.

9. A method for obtaining data associated with a triggering event by an autonomous drone, the method comprising:
   automatically deploying the autonomous drone from a vehicle in response to the triggering event, wherein the triggering event includes at least one of a single-vehicle accident, a multi-vehicle accident, a hit-and-run scenario, and/or a damage or vandalism scenario to the vehicle;
   recording, using the autonomous drone while being deployed, data associated with the vehicle, wherein the recorded data further includes one or more of data associated with one or more other vehicles involved in or damaged during the triggering event, one or more people involved in or hurt during the triggering event, and/or property involved in or damaged during the triggering event; and
   the autonomous drone performing a plurality of first automatic actions upon being deployed only when the triggering event includes at least one of the single-vehicle accident or the multi-vehicle accident;
   if the triggering event does not include at least one of the single-vehicle accident or the multi-vehicle accident, the autonomous drone performing a plurality of second automatic actions upon being deployed only when the triggering event includes at least one of the hit-and-run scenario or the damage or vandalism scenario to the vehicle;

wherein the plurality of second automatic actions are different than the plurality of first of automatic actions; and storing the recorded data in at least one location.

10. The method according to claim 9, wherein, when the triggering event comprises one or more of the hit-and-run scenario and/or the damage or vandalism scenario to the vehicle, the plurality of second automatic actions further includes following at least one of a moving vehicle causing the triggering event to the vehicle in which the autonomous drone is provided and/or a person causing damage to the vehicle in which the autonomous drone is provided.

11. The method according to claim 9, wherein storing the recorded data in at least one location includes at least one of uploading the recorded data to cloud storage, storing the recorded data to a mobile device, and/or storing the recorded data locally on board the autonomous drone.

12. The method according to claim 11, the method further comprising storing the recorded data according to a prioritization, wherein uploading the recorded data to cloud storage is a higher priority than either of storing the recorded data to the mobile device or storing the recorded data locally on board the autonomous drone.

13. The method according to claim 9, wherein the autonomous drone is automatically deployed from the vehicle in a first configuration; and wherein the plurality of first automatic actions and/or the plurality of second automatic actions further includes the autonomous drone transitioning from the first configuration to a second configuration.

14. The method according to claim 13, wherein the second configuration is a deployed configuration; and wherein the plurality of first automatic actions and/or the plurality of second automatic actions further includes stabilizing the autonomous drone and orienting at least one sensor towards a scene of the triggering event.

15. The method according to claim 9, wherein recording data associated with the vehicle in which the autonomous drone is provided includes obtaining data from at least one sensor on board the vehicle.

16. A system for deploying an autonomous drone in response to a triggering event, the system comprising:

a vehicle;

the autonomous drone provided in the vehicle;

a drone control system in the vehicle, wherein the drone control system is configured to:

detect the triggering event associated with the vehicle, wherein the triggering event includes at least one of a single-vehicle accident, a multi-vehicle accident, a hit-and-run scenario, and/or a damage or vandalism scenario to the vehicle;

upon detection of the triggering event, automatically deploy the autonomous drone from the vehicle;

record, using the autonomous drone while being deployed, data associated with the vehicle;

wherein, upon being deployed, the autonomous drone is configured to implement a plurality of first automatic actions only when the triggering event includes at least one of the single-vehicle accident or the multi-vehicle accident;

if the triggering event does not include at least one of the single-vehicle accident or the multi-vehicle accident, the autonomous drone is configured to implement a plurality of second automatic actions only when the triggering event includes at least one of the hit-and-run scenario or the damage or vandalism scenario to the vehicle; and wherein the plurality of second automatic actions are different than the plurality of first of automatic actions.

17. The system according to claim 16, further comprising a storage area in the vehicle;

the autonomous drone being in a first configuration inside the storage area prior to being deployed.

18. The system according to claim 17, further comprising a launch device installed in the storage area external to the autonomous drone, the launch device providing an upward force to the autonomous drone that is configured to launch the autonomous drone upon detection of the triggering event.

19. The system according to claim 18, wherein, upon being launched, the autonomous drone is configured to transition from the first configuration to a second configuration, the second configuration including stabilizing the autonomous drone and orienting at least one sensor on the autonomous drone towards a scene of the triggering event.

20. The system according to claim 16, the vehicle including at least one sensor configured to detect the triggering event; and wherein the at least one sensor includes one or more of an accelerometer, a G sensor, and/or a microphone.

* * * * *